US012529908B2

(12) United States Patent
An et al.

(10) Patent No.: US 12,529,908 B2
(45) Date of Patent: Jan. 20, 2026

(54) ROTATING MECHANISM OF GLASSES, GLASSES, AND SMART GLASSES

(71) Applicant: GUANGDONG OPPO MOBILE TELECOMMUNICATIONS CORP., LTD., Guangdong (CN)

(72) Inventors: Zhongyu An, Guangdong (CN); Ruitian Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 370 days.

(21) Appl. No.: 18/349,003

(22) Filed: Jul. 7, 2023

(65) Prior Publication Data

US 2023/0350225 A1   Nov. 2, 2023

Related U.S. Application Data

(63) Continuation of application No. PCT/CN2021/143770, filed on Dec. 31, 2021.

(30) Foreign Application Priority Data

Feb. 20, 2021   (CN) .......................... 202110194484.8

(51) Int. Cl.
*G02C 5/22*      (2006.01)
*G02C 11/00*     (2006.01)

(52) U.S. Cl.
CPC ............ *G02C 5/2218* (2013.01); *G02C 11/10* (2013.01)

(58) Field of Classification Search
CPC .... G02C 5/2218; G02C 11/10; G02C 5/2236; G02C 11/00; G02C 2200/26
See application file for complete search history.

(56) References Cited

U.S. PATENT DOCUMENTS

2005/0157253 A1*  7/2005  Thiele .................. G02C 5/2236
                                                              351/140
2011/0273660 A1* 11/2011  Tada ........................ G02C 5/16
                                                              351/114
(Continued)

FOREIGN PATENT DOCUMENTS

CN        101548221 A    9/2009
CN        208569206 U    3/2019
(Continued)

OTHER PUBLICATIONS

Chinese First Office Action and search report from the corresponding Chinese Application No. 202110194484.8, mailed Mar. 15, 2022.

(Continued)

*Primary Examiner* — Mustak Choudhury
(74) *Attorney, Agent, or Firm* — Ladas & Parry, LLP

(57) ABSTRACT

The present application provides a rotating mechanism of glasses, glasses and smart glasses. The rotating mechanism includes a first bracket, a second bracket, an elastic member, and a sliding member; the first bracket is provided with an accommodating space; the elastic member is provided in the accommodating space; the sliding member has one end movably connected to the first bracket by means of the elastic member, and another end rotatably connected to the second bracket; and when the second bracket rotates relative to the first bracket by means of the sliding member, the second bracket drives the sliding member to slide relative to the accommodating space, such that the elastic member is elastically deformed.

19 Claims, 13 Drawing Sheets

(56) References Cited

U.S. PATENT DOCUMENTS

2021/0215952 A1* 7/2021 Fang .................. G02C 5/22
2021/0389605 A1* 12/2021 Kan .................. H02J 7/0044

FOREIGN PATENT DOCUMENTS

| CN | 208766391 U  | 4/2019  |
|----|--------------|---------|
| CN | 209542984 U  | 10/2019 |
| CN | 111965841 A  | 11/2020 |
| CN | 112904589 A  | 6/2021  |
| WO | 2020136528 A1 | 7/2020 |
| WO | 2022174682 A1 | 8/2022 |

OTHER PUBLICATIONS

Chinese Second Office Action from the corresponding Chinese Application No. 202110194484.8, mailed Dec. 5, 2022.
International Search Report of the PCT Application No. PCT/CN2021/143770, mailed Mar. 21, 2022.
Written Opinion of the International Searching Authority in International Application No. PCT/CN2021/143770, mailed Mar. 21, 2022. With machine English translation provided by WIPO.

\* cited by examiner

20

20

10

US 12,529,908 B2

ROTATING MECHANISM OF GLASSES, GLASSES, AND SMART GLASSES

This application is a continuation of International (PCT) Patent Application No. PCT/CN2021/143770, filed on Dec. 31, 2021, which claims the priority of Chinese Patent Application No. 202110194484.8, filed on Feb. 20, 2021, both of which are herein incorporated by reference in their entireties.

TECHNICAL FIELD

The present disclosure relates to the technical field of wearable devices, in particular to a rotating mechanism of glasses, glasses and smart glasses.

BACKGROUND

A support frame and support legs of a glasses frame in the related art may be movably connected. For example, the support frame and the support leg are connected by a rotating shaft, such that the support frame may be opened and closed. As the number of times of use increases, the connection between the support frame and the support leg is easy to loosen.

SUMMARY OF THE DISCLOSURE

Embodiments of the present disclosure provide a rotating mechanism of glasses. The rotating mechanism includes a first bracket, a second bracket, an elastic member, and a sliding member. The first bracket is provided with an accommodating space. The elastic member is disposed in the accommodating space. One end of the sliding member is movably connected to the first bracket through the elastic member, another end of the sliding member is rotatably connected to the second bracket. When the second bracket rotates relative to the first bracket through the sliding member, the second bracket drives the sliding member to slide relative to the accommodating space to allow the elastic member to be elastically deformed.

Embodiments of the present disclosure provide glasses. The glasses include the above-mentioned rotating mechanism.

Embodiments of the present disclosure provide smart glasses. The smart glasses include a rotating mechanism and a processor. The rotating mechanism of glasses is the rotating mechanism as described above. The processor is configured to process acquired data to enable the smart glasses to realize a preset function.

DETAILED DESCRIPTION

Figure 1:
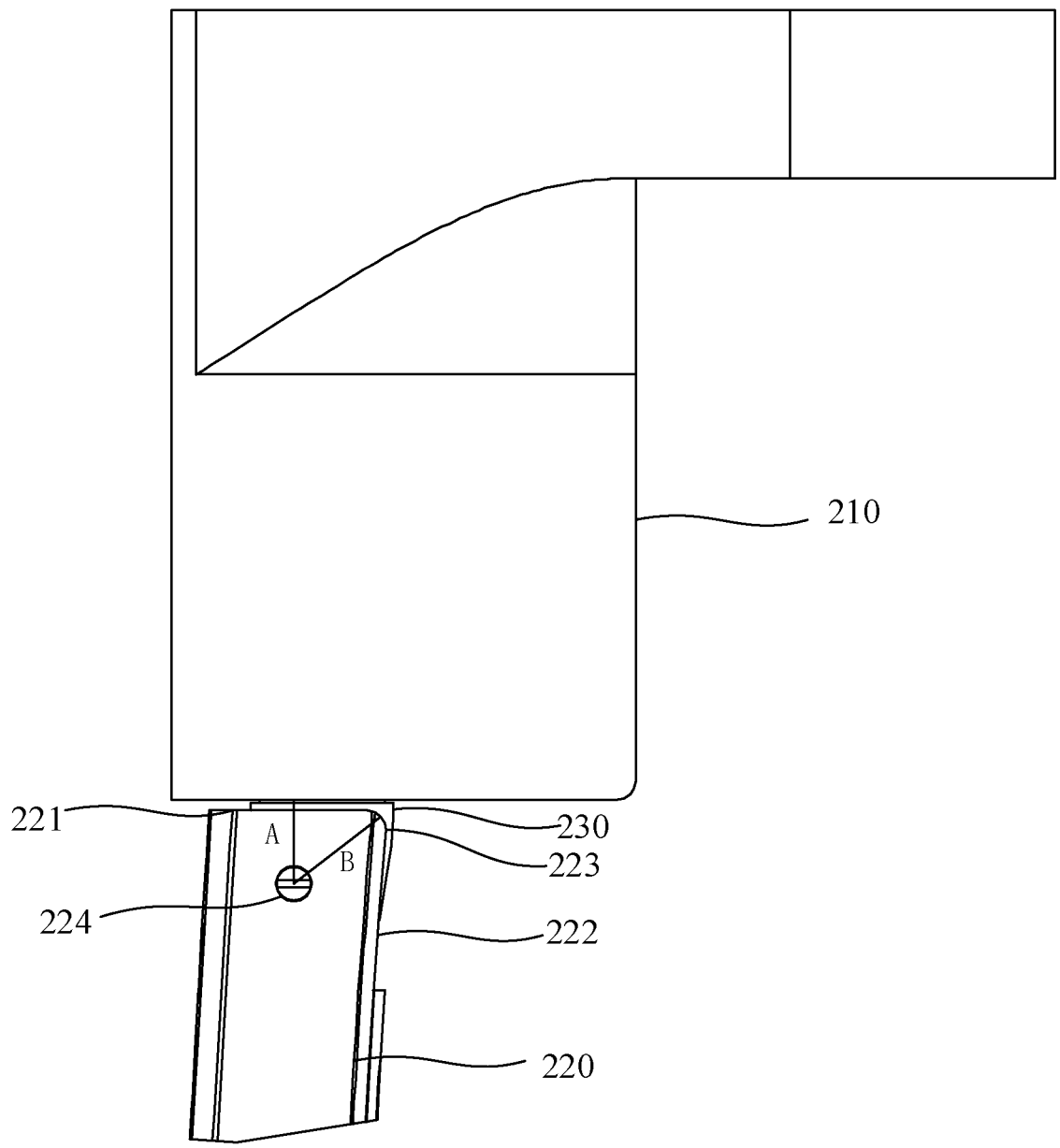
FIG. 1 is a first structural schematic view of a rotating mechanism of glasses according to an embodiment of the present disclosure.

The technical solution in the embodiments of the present disclosure will be clearly and completely described below in conjunction with the drawings in the embodiments of the present disclosure. Apparently, the described embodiments are only some of the embodiments of the present disclosure, not all of them. Based on the embodiments in the present disclosure, all other embodiments obtained by those skilled in the art without making creative efforts belong to the protection scope of the present disclosure.

The embodiments of the present disclosure provide a rotating mechanism of glasses. The rotating mechanism includes a first bracket, a second bracket, an elastic member, and a sliding member. The first bracket is provided with an accommodating space. The elastic member is disposed in the accommodating space. One end of the sliding member is movably connected to the first bracket through the elastic member, another end of the sliding member is rotatably connected to the second bracket. When the second bracket rotates relative to the first bracket through the sliding member, the second bracket drives the sliding member to slide relative to the accommodating space to allow the elastic member to be elastically deformed.

In an optional embodiment of the present disclosure, a protruding part is provided at one end of the sliding member. The protruding part abuts against one end of the elastic member, and the first bracket abuts against another end of the elastic member. When the second bracket rotates relative to the first bracket, the protruding part and the first bracket jointly press the elastic member.

In an optional embodiment of the present disclosure, the sliding member is provided with a groove. The first bracket and the groove form a receiving space, and the elastic member is disposed in the receiving space.

In an optional embodiment of the present disclosure, a groove wall of the groove abuts against the elastic member, and the protruding part cooperates with the groove wall of the groove to limit a position of the elastic member in the accommodating space.

In an optional embodiment of the present disclosure, the elastic member is a spring, the groove wall of the groove is an arc-shaped groove wall, and the arc-shaped groove wall cooperates with the protruding part to limit the position of the elastic member in the accommodating space.

In an optional embodiment of the present disclosure, the first bracket is further provided with a limiting member, the limiting member is fixedly arranged in the accommodating space, and the limiting member is used to limit a position of the sliding member in the accommodating space.

In an optional embodiment of the present disclosure, the first bracket is provided with a fixing part that cooperates with a fixing member, and the limiting member is provided with a through hole corresponding to the fixing member. The fixing member runs through the corresponding through hole and is fixedly connected to the fixing part of the first bracket.

In an optional embodiment of the present disclosure, the limiting member is also provided with a clamping slot, and the first bracket is provided with a protrusion. When the limiting member is fixedly connected to the first bracket, the protrusion engages with the clamping slot.

In an optional embodiment of the present disclosure, the limiting member is provided with two clamping slots, and the first bracket is provided with two protrusions. When the limiting member is fixedly connected to the first bracket, one of the protrusions is engaged with one of the clamping slots.

In an optional embodiment of the present disclosure, the first bracket is provided with an opening, the opening faces the second bracket, and the opening communicates with the accommodating space. The sliding member passes through the opening, the limiting member is provided with a sliding groove, the sliding groove communicates with the opening, and a part of the sliding member is arranged in the sliding groove.

In an optional embodiment of the present disclosure, the first bracket is further provided with a covering part, the covering part covers a notch of the sliding groove and is fixedly connected to the limiting member. The covering part and the limiting member surround to form a sliding passage, and a part of the sliding member is arranged in the sliding passage.

In an optional embodiment of the present disclosure, the sliding member is provided with a groove, and the limiting member a wall of a sliding groove formed by the limiting member is provided with a limiting slot, and a groove wall of the limiting slot and a groove wall of the groove formed by the sliding member surround to form a receiving space, and the elastic member is arranged in the receiving space.

In an optional embodiment of the present disclosure, one end portion of the second bracket adjacent to the first bracket includes a first side and a second side adjacent to each other. A corner is provided between the first side and the second side. The second bracket is rotatably connected to the sliding member through a rotating member. A distance from the rotating member to the first bracket is smaller than a distance from the rotating member to the corner. When the second bracket rotates relative to the sliding member with the rotating member as an axis, the corner abuts against the first bracket.

In an optional embodiment of the present disclosure, the sliding member is provided with a fixing hole for cooperating with the rotating member. The second bracket is provided with a through hole corresponding to the fixing hole. The rotating member passes through the through hole and the fixing hole to allow the second bracket to rotate relative to the sliding member through the rotating member.

In an optional embodiment of the present disclosure, the sliding member is further provided with another fixing hole, the other fixing hole and the fixing hole are respectively arranged at opposite ends of the sliding member. Another through hole of the second bracket is arranged corresponding to the other fixing hole. The rotating member passes through the fixing hole of the sliding member, the through hole of the second bracket, the other fixing hole of the sliding member and the other fixing hole of the second bracket.

In an optional embodiment of the present disclosure, the rotating member is a half-thread set screw partially provided with threads.

In an optional embodiment of the present disclosure, the sliding member is provided with an opening hole to allow a flexible circuit board to pass through.

In an optional embodiment of the present disclosure, a direction in which the sliding member slides relative to the accommodating space is the same as a direction in which the flexible circuit board penetrates.

Figure 2:
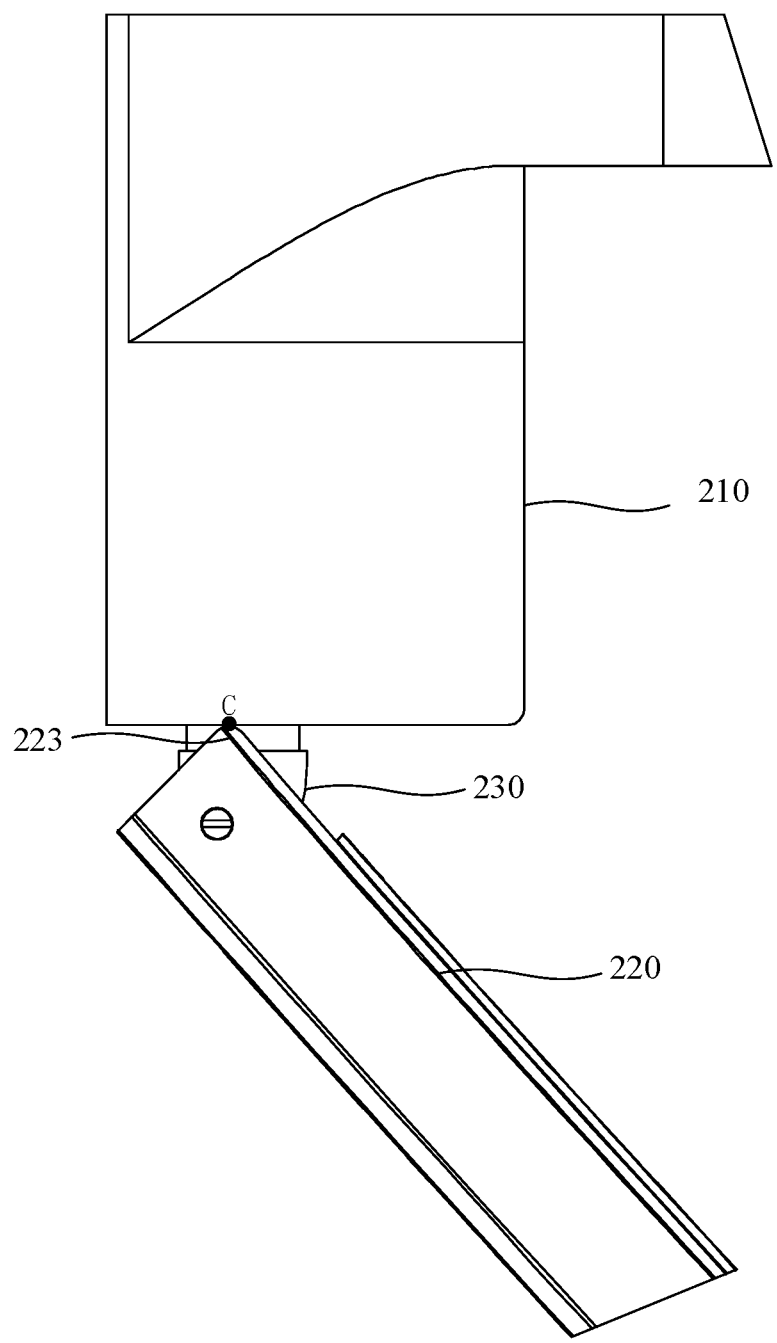
FIG. 2 is a second structural schematic view of a rotating mechanism of glasses according to an embodiment of the present disclosure.
Figure 3:
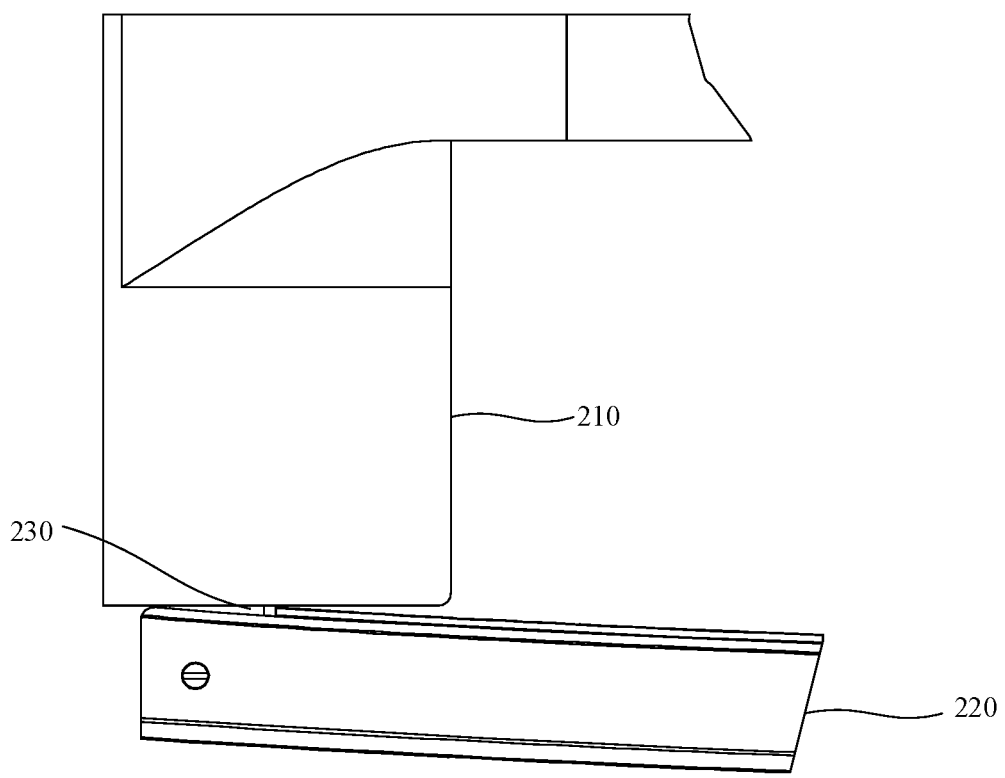
FIG. 3 is a third structural schematic view of a rotating mechanism of glasses according to an embodiment of the present disclosure.
Figure 4:
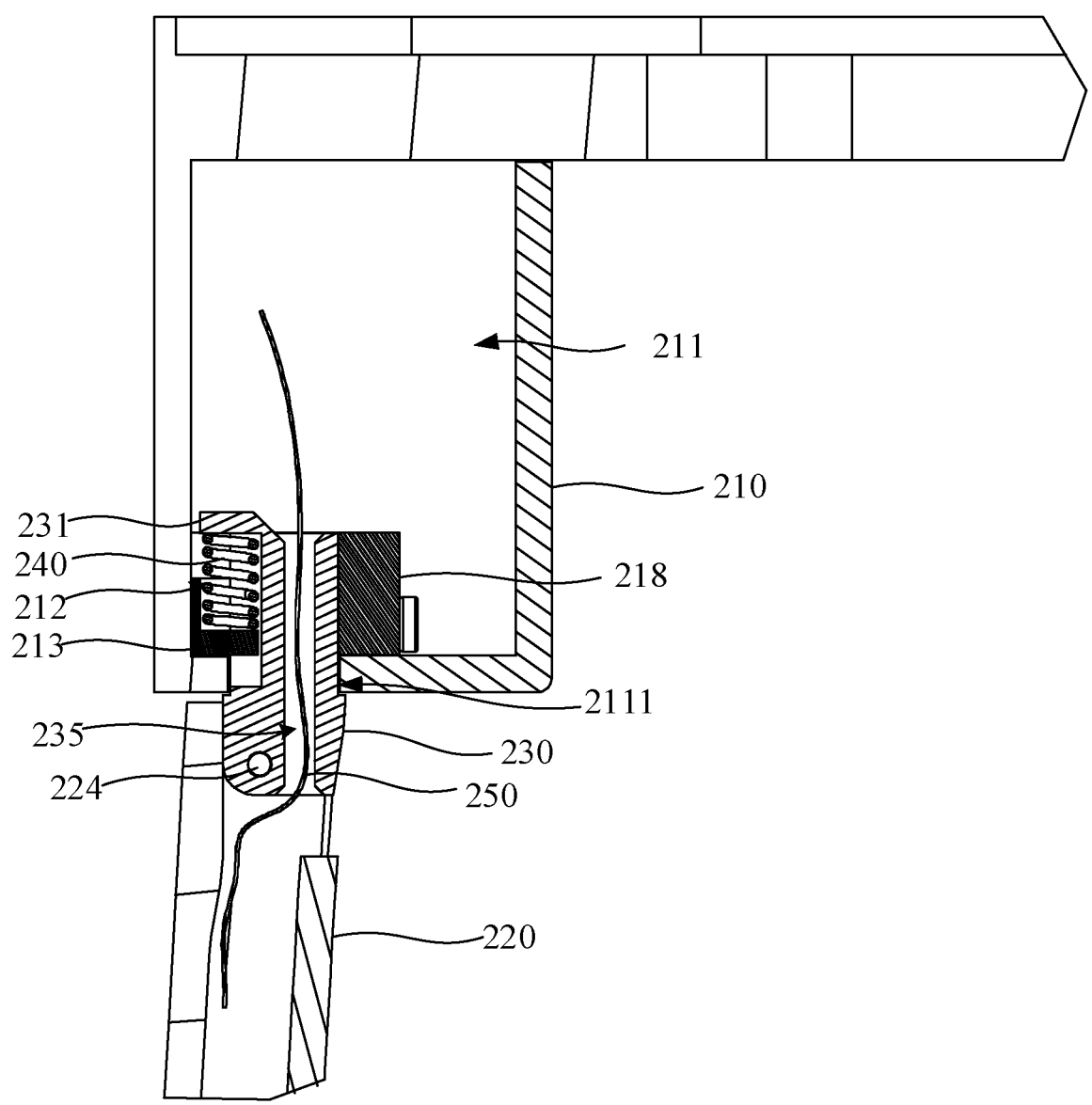
FIG. 4 is a schematic cross-sectional view of the rotating mechanism shown in FIG. 1.
Figure 5:
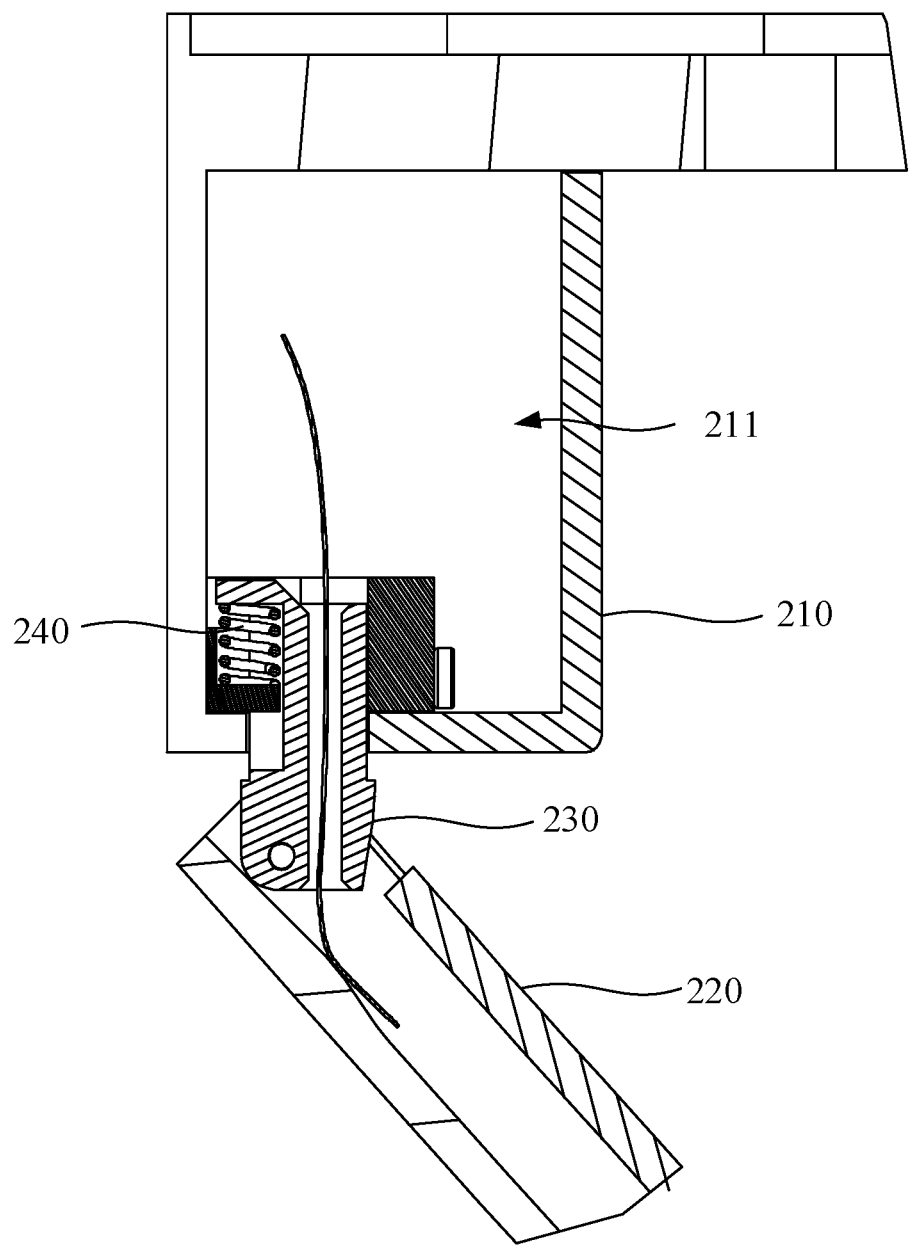
FIG. 5 is a schematic cross-sectional view of the rotating mechanism shown in FIG. 2.
Figure 6:
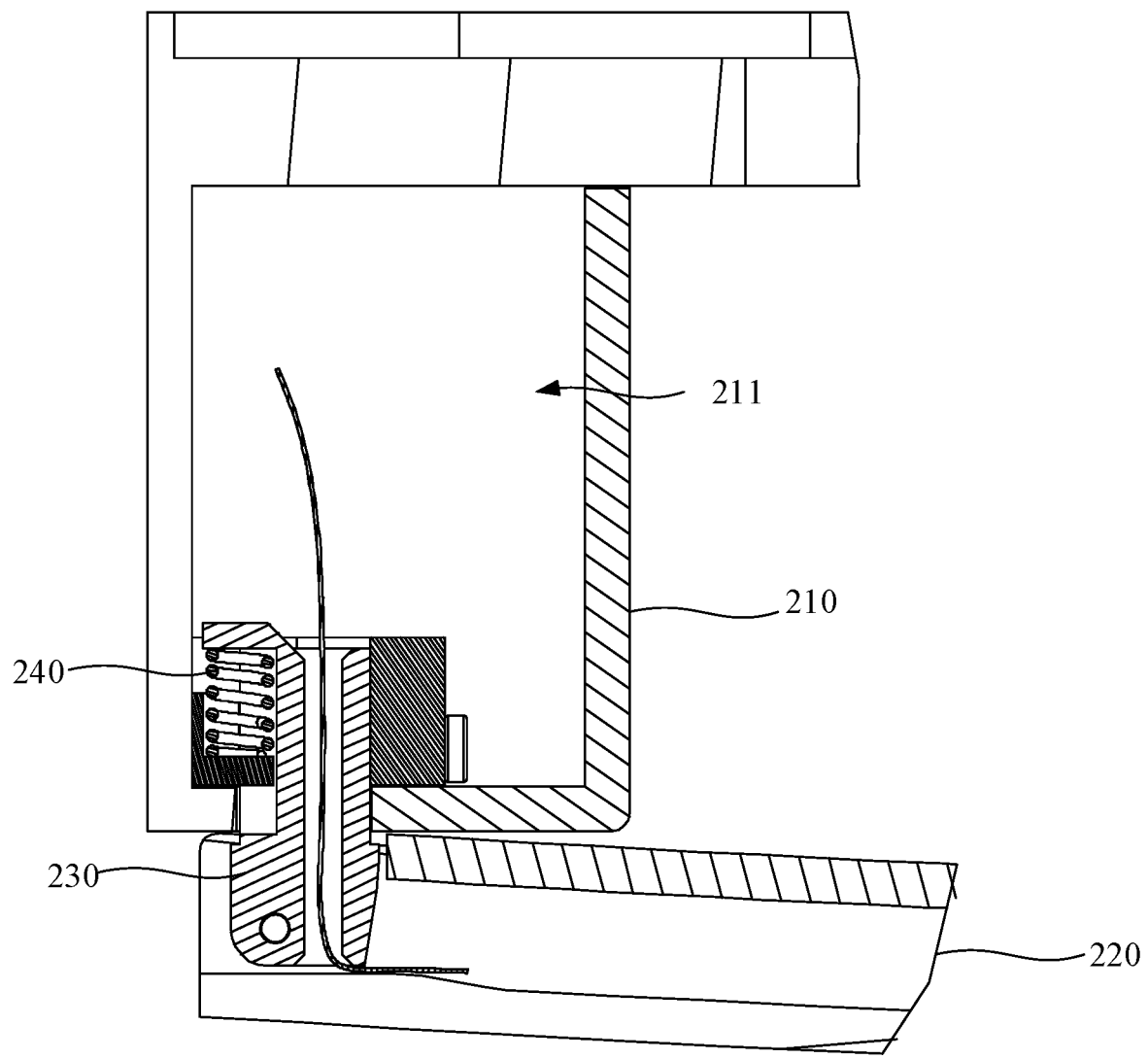
FIG. 6 is a schematic cross-sectional view of the rotating mechanism shown in FIG. 3.
Figure 7:
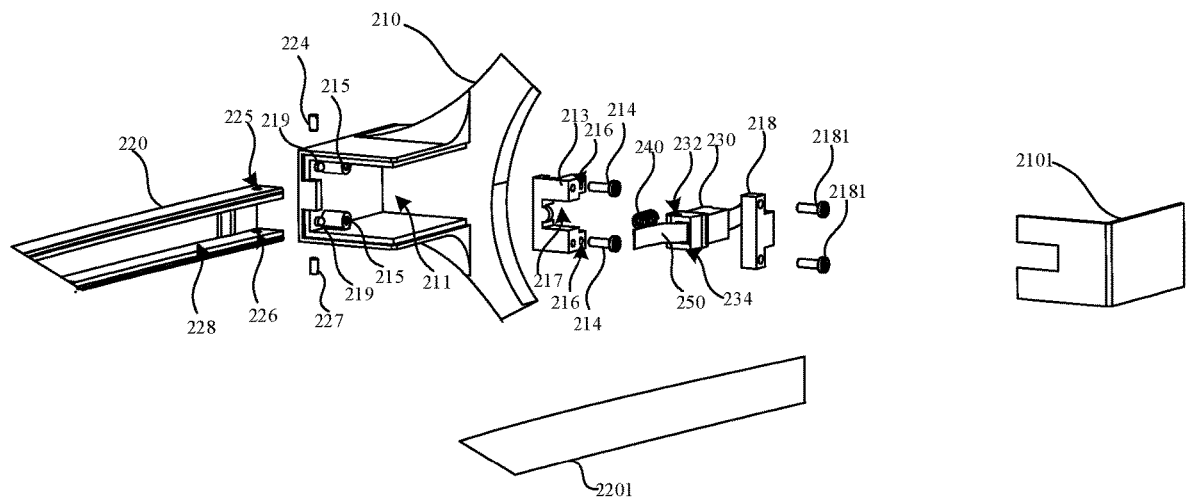
FIG. 7 is an exploded schematic view of a rotating mechanism of glasses according to an embodiment of the present disclosure.

As shown in FIG. 1 to FIG. 6, FIG. 1 is a first structural schematic view of a rotating mechanism of glasses according to an embodiment of the present disclosure, FIG. 2 is a second structural schematic view of a rotating mechanism of glasses according to an embodiment of the present disclosure, FIG. 3 is a third structural schematic view of a rotating mechanism of glasses according to an embodiment of the present disclosure, FIG. 4 is a schematic cross-sectional view of the rotating mechanism shown in FIG. 1, FIG. 5 is a schematic cross-sectional view of the rotating mechanism shown in FIG. 2, and FIG. 6 is a schematic cross-sectional view of the rotating mechanism shown in FIG. 3.

The rotating mechanism 200 of glasses may be understood as the rotating mechanism 200, which is mainly applied to glasses. Glasses are commonly used devices by users. It may be understood that glasses usually have a glasses frame and glasses legs, and the glasses frame and the glasses legs may be connected by rotating shaft screws. During long-term use by the user, a gap between the glasses frame and the glasses legs tends to become larger, which makes it easier for the glasses frame and the glasses legs to rotate or shake through the rotating shaft screws, making the cooperation between the glasses frame and the glasses legs not stable enough. During wearing process, it is often not stable enough to wear, and it is easy to fall off. Moreover, during the storage process, as the support frame and the support legs are too loose, the support legs are likely to generate a large force and collide with the support frame, which will not only further cause the position of the rotating shaft to become looser, but also cause damage to lens.

Therefore, the embodiments of the present disclosure proceed from practical needs, and the long-term stability between the first bracket 210 and the second bracket 220 may be maintained through the rotating mechanism 200 defined in the embodiments of the present disclosure, which is not only convenient for users to use, but also beneficial to the rotating mechanism 200 and plays a protective role when applied to glasses. It should be noted that the rotating mechanism 200 provided in the embodiment of the present disclosure may also be applied to other rotatably connected devices. It may be understood that the rotating mechanism 200 may be applied to other rotatably connected devices, which may be devices similar to glasses.

It should be noted that the rotating mechanism 200 shown in the drawings may only be a part of the structure of the rotating mechanism 200. For example, only a structure in which the first bracket 210 and the second bracket 220 cooperate with each other is shown in the drawings. While other structure of the first bracket 210 and the second bracket 220 is not fully shown, as long as a structure of the first bracket 210 and the second bracket 220 in which the sliding member 230 and the elastic member 240 cooperate with each other is shown. It may be understood that the structure of the first bracket 210 and the second bracket 220 defined by the rotating mechanism 200 provided in the embodiments of the present disclosure are not limited to the content shown in the drawings, and the content shown in the drawings does not constitute a limitation of the structure of the first bracket 210 and the second bracket 220 defined in the embodiments of the present disclosure.

The first bracket 210 is provided with an accommodating space 211. An elastic member 240 is disposed in the accommodating space 211. One end of a sliding member 230 is movably connected to the first bracket 210 through the elastic member 240. Another end of the sliding member 230 is rotatably connected to the second bracket 220. When the second bracket 220 rotates relative to the first bracket 210 through the sliding member 230, the second bracket 220 drives the sliding member 230 to slide relative to the accommodating space 211 to allow the elastic member 240 to be elastically deformed.

Exemplarily, when the second bracket 220 is rotated relative to the first bracket 210 through the sliding member 230, the rotating mechanism 200 may realize different states, such as an unfolded state and a folded state.

The unfolded state may be understood as that the first bracket 210 and the second bracket 220 are arranged in a same direction, such as the first bracket 210 and the second bracket 220 are adjacently arranged in the same direction. FIG. 1 and FIG. 4 show the first bracket 210 and the second bracket 220 in the unfolded state. The folded state may be understood as that the first bracket 210 and the second bracket 220 are arranged in different directions, such as the first bracket 210 and the second bracket 220 are arranged perpendicular to each other. FIG. 3 and FIG. 6 show the first bracket 210 and the second bracket 220 in the folded state. It may be understood that other states may also be realized between the first bracket 210 and the second bracket 220, such as being defined as an intermediate state. A state when the first bracket 210 and the second bracket 220 are in a movable range except the unfolded state and the folded state, the state may be understood as the intermediate state. FIG. 2 and FIG. 5 show the intermediate state of the first bracket 210 and the second bracket 220.

When the rotating mechanism 200 is in the unfolded state, the first bracket 210 and the second bracket 220 are arranged along the same direction. As shown in FIG. 1 and FIG. 4, an end portion of the second bracket 220 adjacent to the first bracket 210 includes a first side 221 and a second side 222 adjacent to each other. A corner 223 is disposed between the first side 221 and the second side 222. The second bracket 220 is rotatably connected to the sliding member 230 through the rotating member 224. A distance A from the rotating member 224 to the first bracket 210 is smaller than a distance B from the rotating member 224 to the corner 223. As a result, when the second bracket 220 rotates relative to the sliding member 230 with the rotating member 224 as an axis, the corner 223 may be in contact with the first bracket 210. As shown in FIG. 2 and FIG. 5, the rotating mechanism 200 is in the intermediate state, when the second bracket 220 slides relative to the sliding member 230 with the rotating member 224 as the axis, a contact point C between the corner 223 and the first bracket 210 becomes a fulcrum to form a lever, the second bracket 220 drives the sliding member 230 connected to it to pull the sliding member 230 outside the accommodating space 211. At this time, the sliding member 230 and the first bracket 210 jointly press the elastic member 240, and the elastic member 240 undergoes elastic deformation. At the same time, the squeezed elastic member 240 generates a reaction force on the sliding member 230, pulling the sliding member 230 into the accommodating space 211. As the rotating member 224 arranged on the second bracket 220 rotates to a farthest position from the first bracket 210, a compression amount of the first bracket 210 and the sliding member 230 on the elastic member 240 reaches a maximum value. If the second bracket 220 continues to rotate towards the first bracket 210, the amount of compression of the elastic member 240 by the first bracket 210 and the sliding member 230 will gradually decrease from the maximum value until the rotating mechanism 200 is in the folded state. As shown in FIG. 3 and FIG. 6, the rotating mechanism 200 is in the folded state, and in this case, the second bracket 220 is in a relative perpendicular state to the first bracket 210. The second bracket 220 provided in the present embodiment of the present disclosure is connected to the first bracket 210 through the sliding member 230 and the elastic member 240, such that when the rotating mechanism 200 switches between the unfolded state, the intermediate state and the folded state, the sliding member 230 and the first bracket 210 changes the amount of compression of the elastic member 240 in a gradually increasing or decreasing way, and the elastic deformation of the elastic member 240 produces a reaction force on the sliding member 230 which produces resistance to the rotation of the second bracket 220 relative to the first bracket 21. That is to say, during the rotation process of the second bracket 220 relative to the first bracket 210, a torsion force is generated such that the rotating mechanism 200 may rotate more stably during the conversion of different states.

Figure 8:
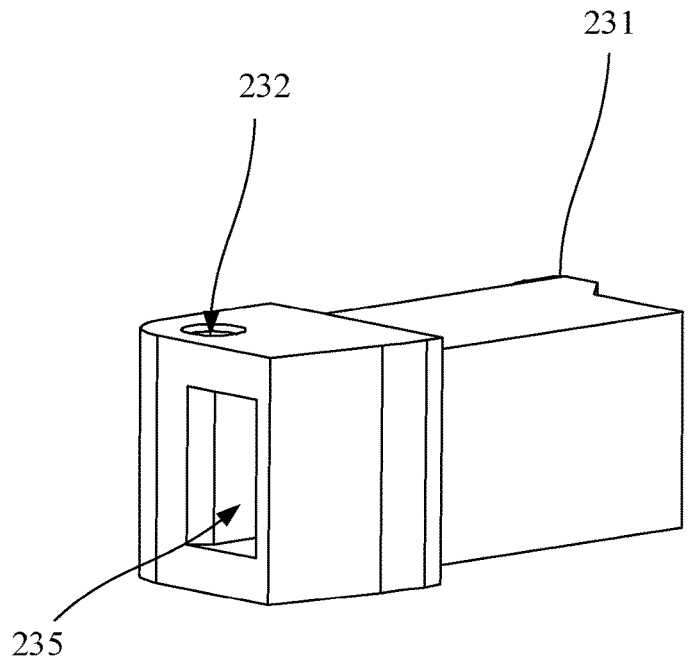
FIG. 8 is a schematic view of a sliding member in a first direction according to an embodiment of the present disclosure.
Figure 9:
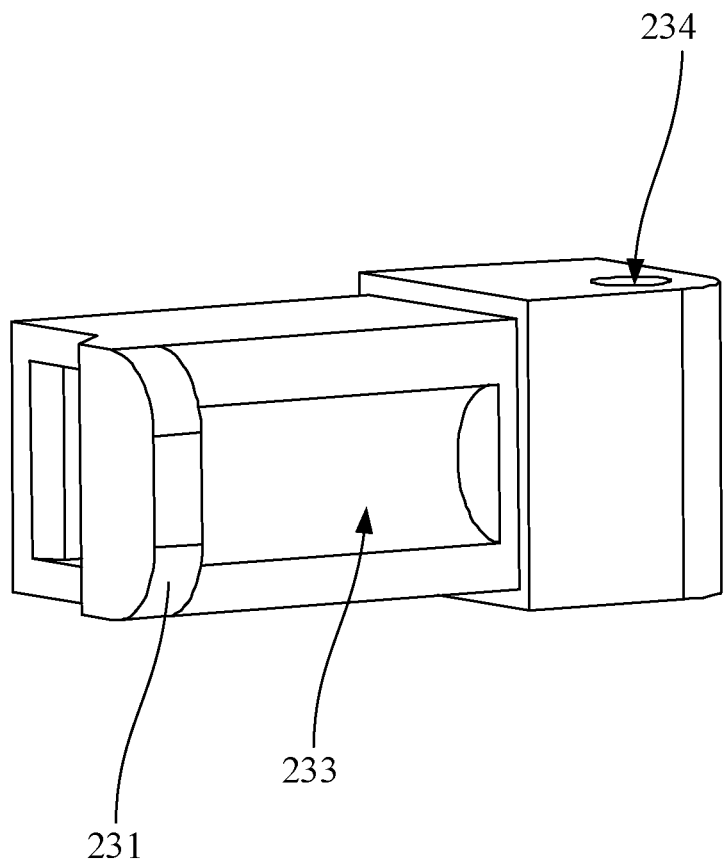
FIG. 9 is a schematic view of a sliding member in a second direction according to an embodiment of the present disclosure.
Figure 10:
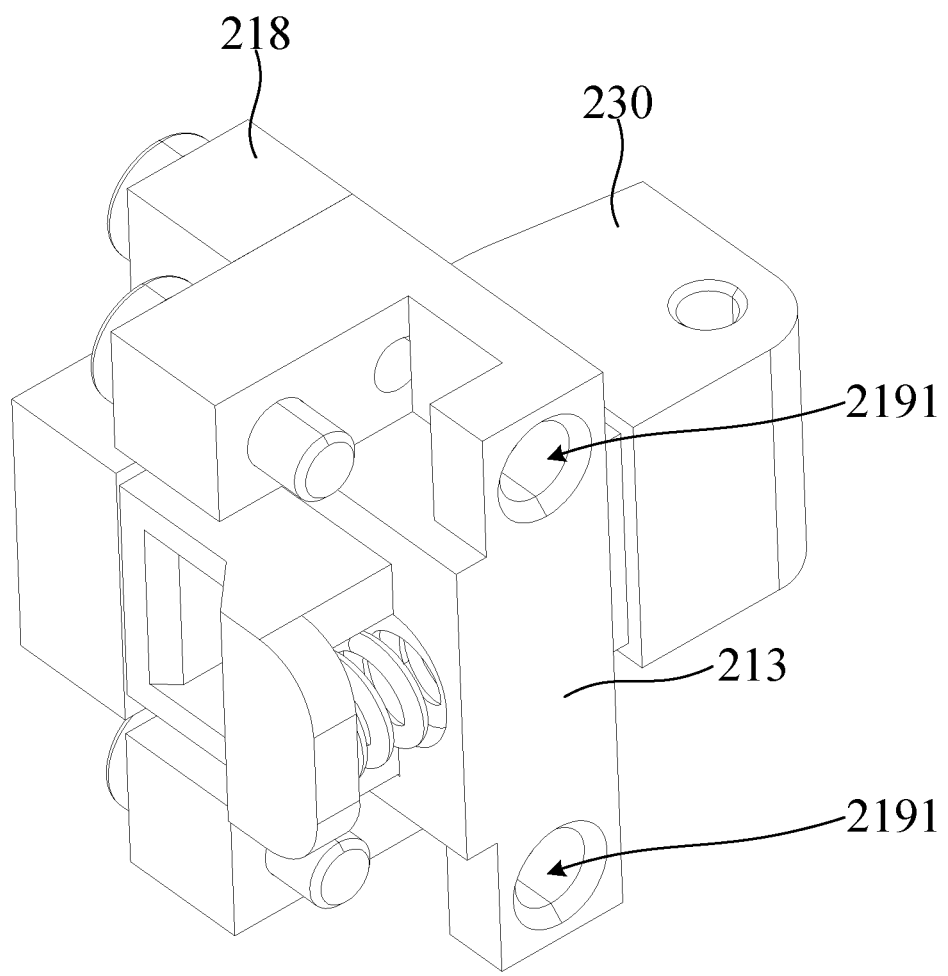
FIG. 10 is an assembled structural schematic view of a sliding member, an elastic member, a limiting member, and a covering part according to an embodiment of the present disclosure.

As shown in FIG. 4, FIG. 7, FIG. 8 and FIG. 9, FIG. 7 is an exploded structural schematic view of a rotating mechanism according to an embodiment of the present disclosure. FIG. 8 is a structural schematic view of a sliding member in a first direction according to an embodiment of the present disclosure. FIG. 9 is a schematic view of a sliding member in a second direction according to an embodiment of the present disclosure.

One end of the sliding member 230 is provided with a protruding part 231, and the protruding part 231 is used to abut against one end of the elastic member 240. The first bracket 210 abuts against another end of the elastic member 240. When the second bracket 220 rotates relative to the first bracket 210, the protruding part 231 and the first bracket 210 press the elastic member 240 together.

In some embodiments, the sliding member 230 is provided with a fixing hole 232 for cooperating with the rotating member 224. The second bracket 220 is provided with a through hole 225 corresponding to the fixing hole 232. The rotating member 224 passes through the through hole 225 of the second bracket 220 and the fixing hole 232 of the sliding member 230 to allow the second bracket 220 to rotate relative to the sliding member 230 through the rotating member 224, such that the second bracket 220 may rotate relative to the first bracket 210. The rotating member 224 may be a half-thread set screw with one part with threads and another part without thread, and the half-thread set screw may restrict the second bracket 220 from moving back and forth relative to the first bracket 210, but does not limit the second bracket 220 to rotate relative to the first bracket 210 with the rotating member 224 as an axis. Of course, in order to improve the stability of the rotating mechanism 200, the sliding member 230 may also be provided with another fixing hole 234, and the other fixing hole 234 and the fixing hole 232 are respectively arranged at opposite ends of the sliding member 230. A through hole 226 of the second bracket 220 is provided corresponding to the fixing hole 234. The rotating member 224 passes through the fixing hole 232 of the sliding member 230 and the through hole 225 of the second bracket 220, and another rotating member 227 passes through the fixing hole 234 of the sliding member 230 and the other through hole 226 of the second bracket 220, which may improve the stability of the rotating mechanism 220.

In some embodiments, the sliding member 230 is further provided with a groove 233, the first bracket 210 and the groove 233 form a receiving space 212, and the elastic member 240 is disposed in the receiving space 212. The shape of a groove wall of the groove 233 may be arranged according to the shape of the elastic member 240. For example, when the elastic member 240 is a spring, the groove wall of the groove 233 is an arc-shaped groove wall, and the arc-shaped groove wall cooperates with the protruding part 231 to limit a position of the elastic member 240 in the accommodating space 211.

In some embodiments, the sliding member 230 is also provided with an opening 235 for a flexible circuit board 250 to pass through. The flexible circuit board 250 is used to electrically connect electronic components on the first bracket 210 and on the second bracket 220. Since a direction in which the sliding member 230 slides relative to the accommodating space 211 is the same as a direction in which the flexible circuit board 250 passes through, when the second bracket 220 rotates relative to the first bracket 210 through the sliding member 230 and the elastic member 240, the flexible circuit board 250 passing through the opening 235 does not need to collide with the sliding member 230, which reduces abrasion of the flexible circuit board 250 due to rotation.

Figure 11:
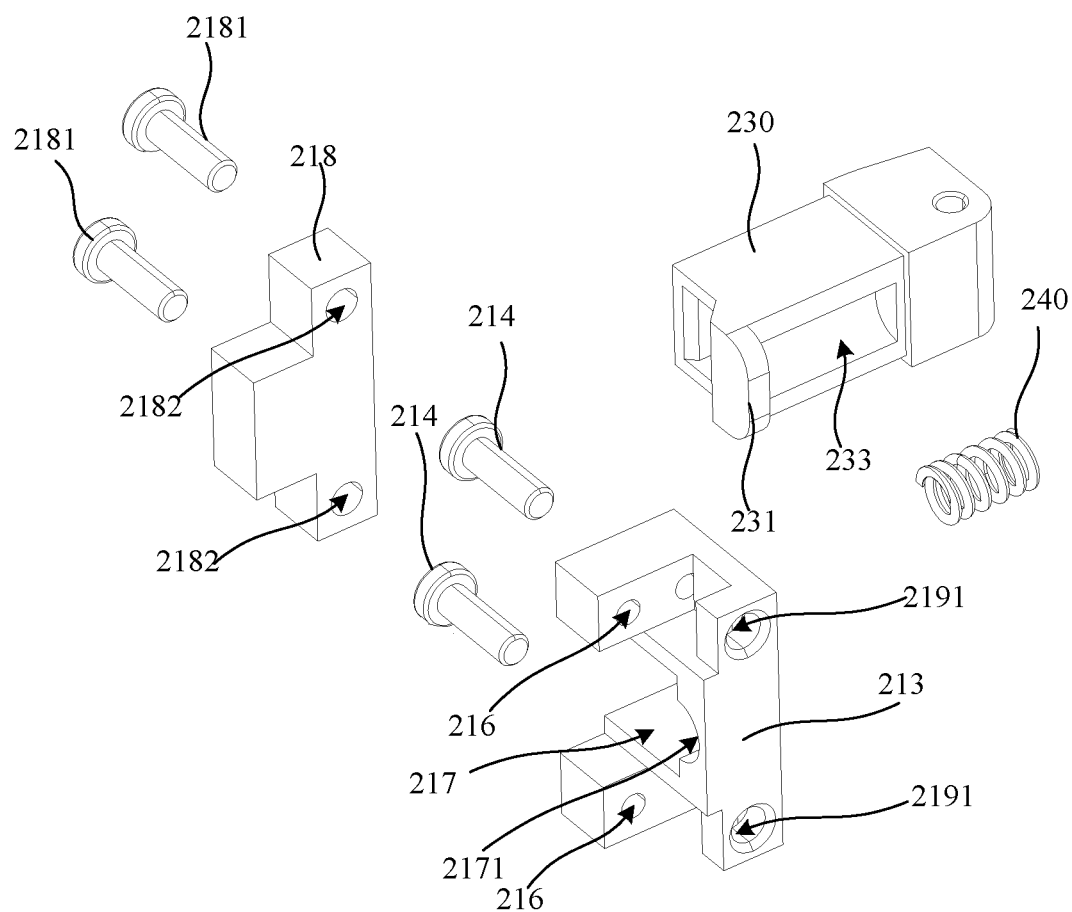
FIG. 11 is an exploded schematic view of the structure shown in FIG. 10.
Figure 12:
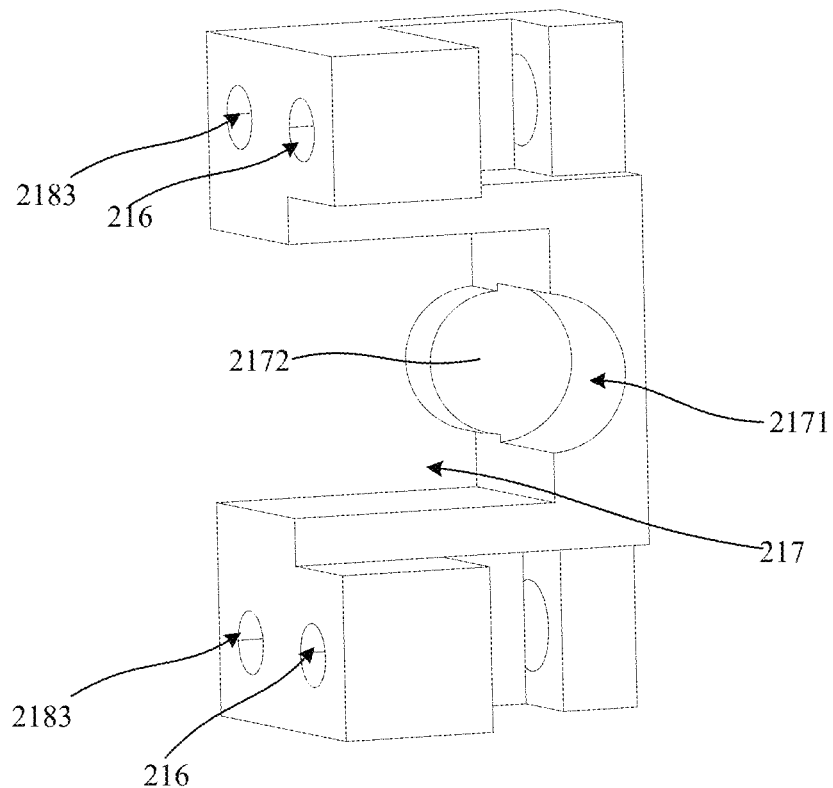
FIG. 12 is a schematic structural view of a limiting member according to an embodiment of the present disclosure.

As shown in FIG. 4, FIG. 7 and FIG. 10 to FIG. 12, FIG. 10 is an assembled structural schematic view of a sliding member, an elastic member, a limiting member, and a covering part according to an embodiment of the present disclosure; FIG. 11 is an exploded schematic view of the structure shown in FIG. 10; FIG. 12 is a schematic structural view of a limiting member provided in an embodiment of the present disclosure.

The first bracket 210 is further provided with a limiting member 213. The limiting member 213 is fixedly disposed in the accommodating space 211 through a fixing member 214. The limiting member 213 is used to limit the position of the sliding member 230 in the accommodating space 211. The first bracket 210 is provided with a fixing part 215 cooperating with the fixing member 214, and the limiting member 213 is provided with a through hole 216 corresponding to the fixing member 214. The fixing member 214 passes through the through hole 216 and is fixedly connected to a fixing part 215 of the first bracket 210, such that the limiting member 213 is fixedly arranged in the accommodating space formed by the first bracket 210. The fixing member 214 may be a fastening structure for fixed connection, such as a nut or a screw, and the fixing member 214 may be a fastening structure with, such as a threaded part, which may be connected to a screw.

In order to increase the stability of the connection between the limiting member 213 and the first bracket 210, the limiting member 213 is also provided with a clamping slot 2191. The first bracket 210 is provided with a protrusion 219. When the first bracket 210 is fixedly connected to the limiting member 213, the protrusion 219 engages with the clamping slot 2191, which may further increase the stability of the connection between the first bracket 210 and the limiting member 213. It may be understood that the number of clamping slot 2191 may be two, and corresponding to the clamping slot 2191, the number of protrusion 219 may also be two. The two protrusions 219 are engaged with the corresponding clamping slots 2191.

The first bracket 210 is provided with an opening 2111, the opening 2111 faces the second bracket 220, the opening 2111 communicates with the accommodating space 211, and the sliding member 230 passes through the opening 2111. The limiting member 210 may be provided with a sliding groove 217, the sliding groove 217 communicates with the opening 2111, a part of the sliding member 230 is arranged in the sliding groove 217. The shape of the sliding groove 217 may be arranged according to the shape of the sliding member 230. The limiting member 213 provided with the sliding groove 217 is used to limit the sliding member 230 in the accommodating space 211 to reduce shaking when the sliding member 230 slides relative to the accommodating space 211.

In order to further reduce shaking when the sliding member 230 slides, the first bracket 210 is also provided with a covering part 218. The covering part 218 covers a notch of the sliding groove 217 and is fixedly connected to the limiting member 213. The covering part 218 surrounds the limiting member 213 to form a sliding channel, and a part of the sliding member 230 is disposed in the sliding channel. The covering part 218 may be fixedly connected to the limiting member 213 through a fixing member 2181, and the fixing member 2181 may be a fixing structure such as a nut or a screw. The covering part 218 is provided with a via hole 2182 matched with the fixing member 2181, and the fixing member 2181 passes through the via hole 2182 and connects with a fixing part 2183 provided on the limiting member 213. The fixing part 2183 may be a structure that cooperates with the fixing member 2181, such as a threaded fixing structure that may be fastened with a screw.

In order to improve the stability of the elastic member 240 in the elastic deformation process, the limiting member 213 forms a limiting slot 2171 on the groove wall of the sliding groove 217. A groove wall of the limiting slot 2171 surrounds the groove wall of the sliding member 230 to form an accommodating space 212, the elastic member 240 is arranged in the accommodating space 212, so as to reduce shaking in the elastic deformation process of the elastic member 240, and improve the stability in the rotation process of the rotating mechanism 200. The shape of the groove wall of the limiting slot 2171 may be arranged according to the the shape of the elastic member 240. The groove wall of the limiting slot 2171 includes a compressing part 2172 for pressing the elastic member 240 when the second bracket 220 rotates relative to the first bracket 210. When the second bracket 220 rotates relative to the first bracket 210, the protruding part 231 of the sliding member 230 and the compressing part 2172 of the limiting member 213 press the elastic member 240 together, such that the elastic member 240 is elastically deformed.

In the embodiments of the present disclosure, both of the first bracket 210 and the second bracket 220 have a damping feel when switching between the unfolded state, the intermediate state, and the folded state. It may be understood that the second bracket 220 is rotationally connected to the sliding member 230 through the rotating member 224. The distance from the rotating member 224 to the first bracket 210 is less than the distance from the rotating member 224 to the corner. As a result, when the second bracket 220 rotates relative to the sliding member 230 with the rotating member 224 as the axis, the corner 223 may abut against the first bracket 210, the contact point between the corner 223 and the first bracket 210 becomes a fulcrum and forms a lever. The second bracket 220 drives the sliding member 230 connected to it, and pulls the sliding member 230 out of the accommodating space 211. In this case, the protruding part 231 of the sliding member 230 and the limiting part 2172 of the limiting member 213 squeezes the elastic member 240 together, and the elastic member 240 undergoes elastic deformation. At the same time, the pressed elastic member 240 produces a reaction force on the sliding member 230, and pulls the sliding member 230 into the accommodating space 211. When the rotating member 224 arranged on the second bracket 220 rotates to the farthest position from the first bracket 210, the amount of compression of the elastic member 240 by the limiting member 213 and the sliding member 230 reaches the maximum value. If the second bracket 220 rotates toward the first bracket 210, and the compression amount of the elastic member 240 by the limiting member 213 and the sliding member 230 gradually decreases from the maximum value until the rotating mechanism 200 is in the folded state. As shown in FIG. 3 and FIG. 6, the rotating mechanism 200 is in the folded state. In this case, the second bracket 220 is in a relative perpendicular state to the first bracket 210. As the distance between the rotating member 224 and the first bracket 210 changes, the amount of elastic deformation of the elastic member 240 also changes, resulting in a changing torsion force, or in other words, a damping feel.

The second bracket 220 provided in the present embodiment of the present disclosure is connected to the first bracket 210 through the sliding member 230 and the elastic member 240, such that when the rotating mechanism 220 switches between the unfolded state, the intermediate state and the folded state, the sliding member 230 and the first bracket 210 changes the amount of compression of the elastic member 240 in a gradually increasing or decreasing way. The elastic deformation of the elastic member 240 produces a reaction force on the sliding member 230 which produces resistance to the rotation of the second bracket 220 relative to the first bracket 210. That is to say, during the rotation process of the second bracket 220 relative to the first bracket 210, a torsion force is generated such that the rotating mechanism may rotate more stably during the conversion of different states.

The sliding member 230 in the present embodiment of the present disclosure is provided with the protruding part 231 abutting against the elastic member 240. When the second bracket 220 rotates relative to the first bracket 210, the sliding member 230 is driven to slide relative to the accommodating space 211, and the protruding part 231 may squeeze the elastic member 240 to cause the elastic member 240 to be elastically deformed, such that the second bracket 220 is more stable during relative rotation to the first bracket 210. In addition, the sliding member 230 is also provided with the opening 235. As the opening 235 communicates with the accommodating space 211 of the first bracket 210 and the opening 235 communicates with the receiving part 228 formed by the second bracket 220, the flexible circuit board 250 passing through the opening 235 may conveniently connect electronic components installed on the first bracket 210 with electronic components installed on the second bracket 210. Further, since a sliding direction of the sliding member 230 is the same as a direction of the opening 235, when the second bracket 220 rotates relative to the first bracket 210, soft rows of the flexible circuit board 250 may be protected from being pinched and scratched by the sliding member 230, the first bracket 210 and the second bracket 220.

The following description is made from the perspective of assembly of the rotating mechanism 200.

As shown in FIG. 1 to FIG. 12, the rotating mechanism of glasses provided by the present disclosure may include the first bracket 210, the second bracket 220, the sliding member 230, the elastic member 240, the limiting member 213 and the covering part 218.

The clamping slot 2191 of the limiting member 213 is engaged with the protrusion 219 of the first bracket 210 to limit the limiting member 213 in the accommodating space 211. Then, two fixing members 214 and the fixing part 215 arranged on the first bracket 210 fixedly connect the limiting member 213 to the first bracket 210.

The elastic member 240 is installed into the limiting slot 2171 of the limiting member 213. The limiting slot 2171 may be a semicircular groove structure, and a side of the sliding member 230 provided with the groove 233 faces the elastic member 240 and is arranged in the sliding groove 217 of the limiting member 213. The groove 233 may be a semicircular groove structure, the elastic member 240 may be a spring. The elastic member 240 is sandwiched in the circular groove formed by the limiting slot 2171 and the groove 233. In order to improve the sliding stability of the sliding member 230 in the sliding process, the covering part 218 is fixedly connected to the limiting member 213 by two fixing parts 2181, such that the covering part 218 and the limiting member 213 surround to form a sliding channel. The sliding member 230 is arranged in the sliding channel, the first bracket cover 2101 is fixedly connected to the first bracket 210 through a dispensing process.

After the glue is solidified, the second bracket 220 is assembled with the sliding member 230 through the rotating member 224 and the rotating part 227. The second bracket 220 is provided with the through hole 225 corresponding to the rotating member 224 and the through hole 226 corresponding to the rotating part 227, the sliding member 230 is provided with the fixing hole 232 corresponding to the rotating member 224 and the fixing hole 234 corresponding to the rotating part 227. The sliding member 230 assembled with the first bracket 210 is installed into a receiving part 228 formed by the second bracket 220. The fixing hole 232 of the sliding member 230 is opposite to the through hole 225 of the second bracket 220, the fixing hole 234 of the sliding member 230 is opposite to the through hole 226 of the second bracket 220. The rotating member 224 passes through the through hole 225 and the fixing hole 232, and the rotating member 227 passes through the through hole 226 and the fixing hole 234, such that the second bracket 220 is rotatably connected to the sliding member 230. In other words, the second bracket 220 may rotate around the rotating member. After the second bracket 220 and the sliding member 230 are assembled, a second bracket cover 2201 is fixedly connected to the second bracket 220 through an adhesive.

The rotating mechanism of the glasses according to an embodiment of the present disclosure not only may produce a damping feel when the second bracket 220 rotates relative to the first bracket 210, but also may improve the stable connection of the first bracket 210 and the second bracket 210 through the sliding member 230 and the elastic member 240, and the first bracket 210 and the second bracket 210 are not easy to loosen. In addition, the rotating mechanism provided by the present disclosure is easy to be assembled and is suitable for mass production.

It should be noted that the rotating mechanism 200 defined in the embodiments of the present disclosure may be applied to glasses. The glasses may be ordinary glasses or smart glasses.

Figure 13:
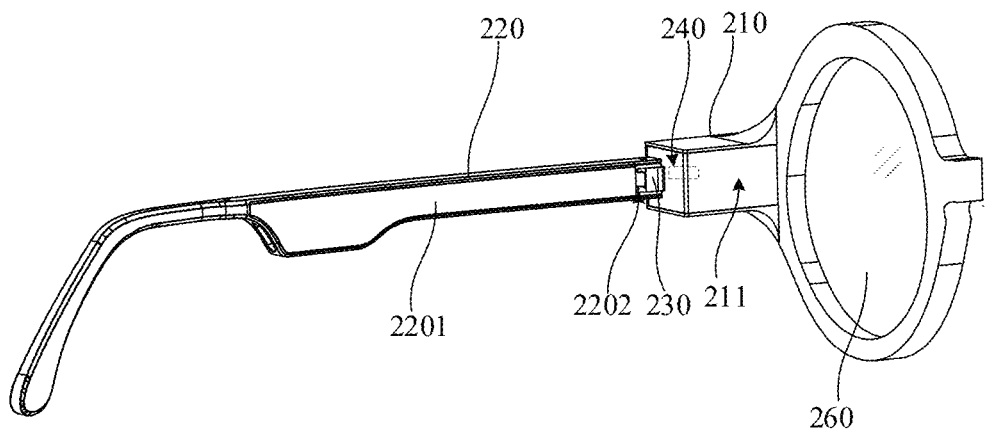
FIG. 13 is a first structural schematic view of glasses according to an embodiment of the present disclosure.
Figure 14:
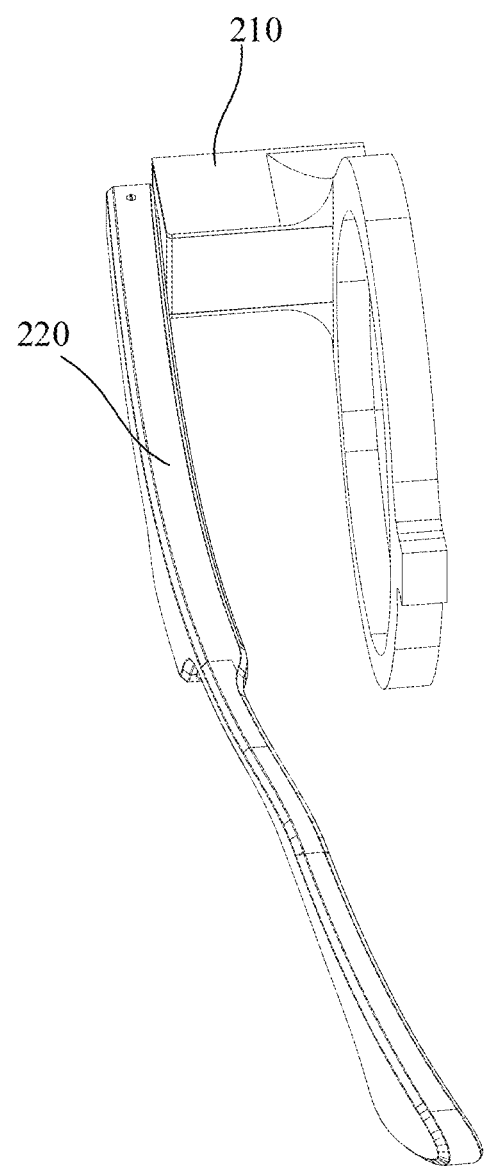
FIG. 14 is a second structural schematic view of glasses according to an embodiment of the present disclosure.
Figure 15:
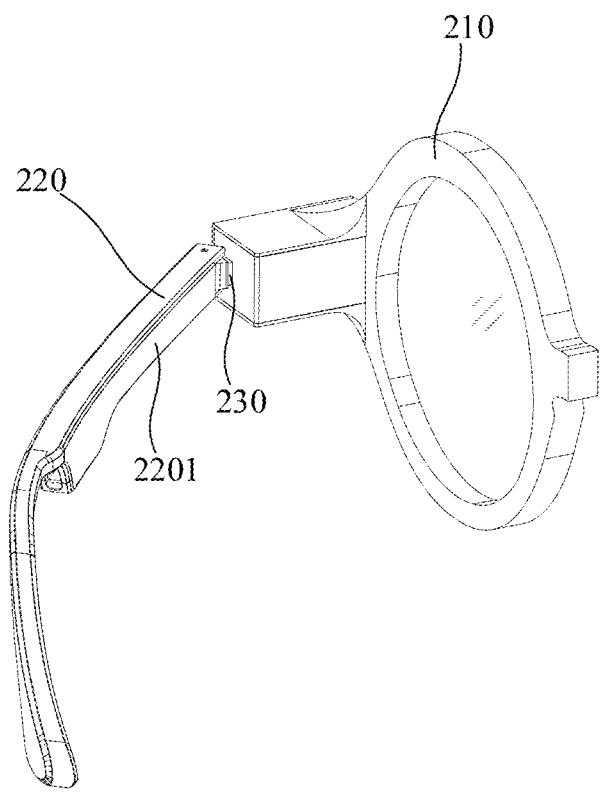
FIG. 15 is a third structural schematic view of glasses according to an embodiment of the present disclosure.

The embodiments of the present disclosure also provide glasses. The glasses include the above-mentioned rotating mechanism. As shown in FIG. 13 to FIG. 15, FIG. 13 is a first structural schematic view of glasses according to an embodiment of the present disclosure; FIG. 14 is a second structural schematic view of glasses according to an embodiment of the present disclosure; and FIG. 15 is a third structural schematic view of glasses according to an embodiment of the present disclosure.

The glasses 20 may include the above-mentioned rotating mechanism 200 and a lens 260. The rotating mechanism 200 includes a first bracket 210, a second bracket 220, a sliding member 230 and an elastic member 240. The first bracket 210 is provided with an accommodating space 211, and the elastic member 240 is arranged in the accommodating space 211. One end of the sliding member 230 is movably connected to the first bracket 210 through the elastic member 240, and another end of the sliding member 230 is rotatably connected to the second bracket 220. When the second bracket 220 rotates relative to the second bracket 220 through the sliding member 230, the second bracket 220 drives the sliding member 230 to slide relative to the accommodating space 211 to allow the elastic member 240 is elastically deformed.

The lens 260 is disposed on the first bracket 210, and a through hole may be provided on the first bracket 210 to place the lens 260. It may be understood that the first bracket 210 also includes a bracket structure (not shown in the drawings) for placing another lens. The first bracket 210 may be understood as a glasses frame, and the second bracket 220 may be understood as a spectacle leg.

In order to allow the second bracket 220 to rotate relative to the first bracket 210 through the sliding member 230, a rotation space 2202 is reserved on the second bracket cover of the second bracket 220.

When the second bracket 220 rotates relative to the first bracket 210 through the sliding member 230, the rotating mechanism 200 may realize different states, such as the unfolded state and the folded state. The unfolded state may be understood as that the first bracket 210 and the second bracket 220 are arranged in the same direction, such as the first bracket 210 and the second bracket 220 are arranged adjacent to each other in the same direction. FIG. 13 shows the first bracket 210 and the second bracket 220 in the unfolded state. The folded state may be understood as that the first bracket 210 and the second bracket 220 are arranged in different directions, such as the first bracket 210 and the second bracket 220 are arranged perpendicular to each other. FIG. 14 shows the folded state of the first bracket 210 and the second bracket 220. It may be understood that other states may also be realized between the first bracket 210 and the second bracket 220, such as being defined as the intermediate state. The state, when the first bracket 210 and the second bracket 220 are in the movable range except the unfolded state and the folded state, may be understood as the intermediate state. FIG. 15 shows the intermediate state of the first bracket 210 and the second bracket 220.

The glasses 20 may be common glasses or smart glasses. When the glasses 20 are smart glasses, some devices such as a processor, a battery, a sensor, etc. may be arranged. Acquired data may be processed by the processor such that the smart glasses may realize a preset function. The preset function is, for example, displaying images through a lens 28, sending out sound signals through a speaker, and the like.

The embodiments of the present disclosure also provide the smart glasses. The smart glasses include a rotating mechanism and a processor. The rotating mechanism is the rotating mechanism as described above. The processor is configured to process acquired data to enable the smart glasses to realize a preset function.

Figure 16:
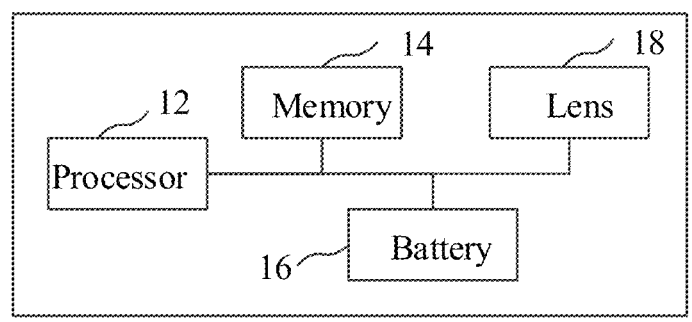
FIG. 16 is a structural schematic view of smart glasses according to an embodiment of the present disclosure.

As shown in FIG. 16, FIG. 16 is a schematic structural view of smart glasses according to an embodiment of the present disclosure. The smart glasses 10 may include a processor 12, a memory 14, a lens 18 and a battery 16. The battery 16 is used to power the smart glasses 10. The battery 16 may be logically connected to the processor 12 through a power management system, such that functions such as charging, discharging, and power consumption management may be realized through the power management system.

The memory 14 may be used to store software programs as well as various data. The memory 14 may mainly include a program storage area and a data storage area. The program storage area may store an operating system, one application required by at least a function (such as a sound playback function, an image playback function, etc.) and the like. The storage data area may store data created according to use of the smart glasses, such as audio data, and the like. In addition, the memory 14 may include a high-speed random access memory, and may also include a non-volatile memory, such as at least one magnetic disk storage device, flash memory device, or other volatile solid-state storage devices.

The processor 12 is a control center of the smart glasses 10, and uses various interfaces and lines to connect various parts of the whole smart glasses 10. For example, the processor 22 is electrically connected to the memory 14, the battery 16 and the lens 18. The processor 12 monitors the smart glasses 10 as a whole by processing or executing software programs and/or modules stored in the memory 14 and invoking data stored in the memory 14. The processor 12 may include one or more processing units.

The structure of the smart glasses 10 in the embodiments of the present disclosure is not limited to the above content, for example, the smart glasses 10 may also include a Bluetooth module, a radio frequency unit, a sensor, and the like. The radio frequency unit may be used for receiving and sending signals in the process of sending and receiving information. The sensor may be a light sensor, a motion sensor, and other sensors. The smart glasses 10 may acquire some data through a Bluetooth module, a radio frequency unit or a sensor, and the processor 12 may process the acquired data such that the smart glasses 20 may realize a preset function. The preset function is, for example, displaying images through the lens 28, sending out sound signals through the speaker, and the like.

In the description of the present disclosure, the terms "first" and "second" are used for descriptive purposes only, and may not be understood as indicating or implying relative importance or implicitly specifying the quantity of indicated technical features. Thus, a feature defined as "first" or "second" may explicitly or implicitly include one or more of the features. In the description of the present disclosure, "plurality" means two or more, unless otherwise specifically defined.

The above disclosure provides many different implementations or examples for implementing different structures of the present disclosure. To simplify the disclosure of the present disclosure, the components and arrangements of specific examples are described above. Of course, they are examples only and are not intended to limit the present disclosure. Furthermore, the present disclosure may repeat reference numerals and/or reference letters in various instances, such repetition is for simplicity and clarity purposes and does not in itself indicate a relationship between the various embodiments and/or arrangements discussed. In addition, various specific processes and material examples are provided herein, but those with ordinary skill in the art may recognize the use of other processes and/or the use of other materials.

The rotating mechanism of glasses, glasses, and smart glasses according to the embodiments of the present disclosure are described above in detail. In this present disclosure, specific examples are used to illustrate the principles and implementation methods of the present disclosure. The descriptions of the above embodiments are only used to help understanding the method of the present disclosure and its core idea. At the same time, for those skilled in the art, according to the idea of the present disclosure, there will be changes in the specific implementation and scope of the present disclosure. In summary, the content of this specification should not be understood for the limitation of the present disclosure.

What is claimed is:

1. A rotating mechanism of glasses, comprising:
a first bracket, provided with an accommodating space;
a second bracket;
an elastic member, disposed in the accommodating space; and
a sliding member, wherein one end of the sliding member is movably connected to the first bracket through the elastic member, another end of the sliding member is rotatably connected to the second bracket; when the second bracket rotates relative to the first bracket through the sliding member, the second bracket drives the sliding member to slide relative to the accommodating space to allow the elastic member to be elastically deformed; and
a protruding part is provided at one end of the sliding member, the protruding part abuts against one end of the elastic member, and the first bracket abuts against another end of the elastic member; when the second bracket rotates relative to the first bracket, the protruding part and the first bracket jointly press the elastic member.

2. The rotating mechanism of glasses according to claim 1, wherein the sliding member is provided with a groove, the first bracket and the groove form a receiving space, and the elastic member is disposed in the receiving space.

3. The rotating mechanism of glasses according to claim 2, wherein a groove wall of the groove abuts against the elastic member, and the protruding part cooperates with the groove wall of the groove to limit a position of the elastic member in the accommodating space.

4. The rotating mechanism of glasses according to claim 3, wherein the elastic member is a spring, the groove wall of the groove is an arc-shaped groove wall, and the arc-shaped groove wall cooperates with the protruding part to limit the position of the elastic member in the accommodating space.

5. The rotating mechanism of glasses according to claim 1, wherein the first bracket is further provided with a limiting member, the limiting member is fixedly arranged in the accommodating space, and the limiting member is used to limit a position of the sliding member in the accommodating space.

6. The rotating mechanism of glasses according to claim 5, wherein the first bracket is provided with a fixing part matched with a fixing member, and the limiting member is provided with a through hole corresponding to the fixing member, and the fixing member passes through the corresponding through hole and is fixedly connected to the fixing part of the first bracket.

7. The rotating mechanism of glasses according to claim 6, wherein the limiting member is further provided with a clamping slot, and the first bracket is provided with a protrusion, and when the limiting member is fixedly connected to the first bracket, the protrusion is engaged with the clamping slot.

8. The rotating mechanism of glasses according to claim 6, wherein the limiting member is provided with two clamping slots, and the first bracket is provided with two protrusions, and when the limiting member is fixedly connected to the first bracket, one of the protrusions is engaged with one of the engaging slots.

9. The rotating mechanism of glasses according to claim 1, wherein the first bracket is provided with an opening, the opening faces the second bracket, the opening communicates with the accommodating space, the sliding member passes through the opening, a limiting member is provided with a sliding groove, the sliding groove communicates with the opening, and a part of the sliding member is arranged in the sliding groove.

10. The rotating mechanism of glasses according to claim 9, wherein the first bracket is further provided with a covering part, and the covering part covers a notch of the sliding groove and is fixedly connected to the limiting member, the covering part and the limiting member surround to form a sliding passage, and a part of the sliding member is disposed in the sliding passage.

11. The rotating mechanism of glasses according to claim 9, wherein the sliding member is provided with a groove, a groove wall of the sliding groove formed by the limiting member is provided with a limiting slot, and a slot wall of the limiting slot and a groove wall of the sliding member surround to form a receiving space, and the elastic member is arranged in the receiving space.

12. The rotating mechanism of glasses according to claim 1, wherein an end portion of the second bracket adjacent to the first bracket comprises a first side and a second side adjacent to each other; a corner is provided between the first side and the second side; the second bracket is rotatably connected to the sliding member through a rotating member; a distance from the rotating member to the first bracket is smaller than a distance from rotating member to the corner; when the second bracket rotates relative to the sliding member with the rotating member as an axis, the corner abuts against the first bracket.

13. The rotating mechanism of glasses according to claim 12, wherein the sliding member is provided with a fixing hole for cooperating with the rotating member, and the second bracket is provided with a through hole corresponding to the fixing hole, the rotating member passes through the through hole and the fixing hole to allow the second bracket to rotate relative to the sliding member through the rotating member.

14. The rotating mechanism of glasses according to claim 13, wherein the sliding member is further provided with another fixing hole; the other fixing hole and the fixing hole are respectively arranged at opposite ends of the sliding member; another through hole on the second bracket is arranged correspondingly to the other fixing hole; the rotating member passes through the fixing hole of the sliding member, the through hole of the second bracket, the other fixing hole of the sliding member, and the other through hole of the second bracket.

15. The rotating mechanism of glasses according to claim 1, wherein the rotating member is a half-threaded set screw partially provided with threads.

16. The rotating mechanism of glasses according to claim 1, wherein the sliding member is provided with an opening to allow a flexible circuit board to pass through.

17. The rotating mechanism of glasses according to claim 16, wherein a direction in which the sliding member slides relative to the accommodating space is the same as a direction in which the flexible circuit board passes through.

18. Glasses, comprising:
a rotating mechanism, wherein the rotating mechanism comprises:
a first bracket, provided with an accommodating space;
a second bracket;
an elastic member, disposed in the accommodating space; and
a sliding member, wherein one end of the sliding member is movably connected to the first bracket through the elastic member, another end of the sliding member is rotatably connected to the second bracket; when the second bracket rotates relative to the first bracket through the sliding member, the second bracket drives the sliding member to slide relative to the accommodating space to allow the elastic member to be elastically deformed; and
a protruding part is provided at one end of the sliding member, the protruding part abuts against one end of the elastic member, and the first bracket abuts against another end of the elastic member; when the second bracket rotates relative to the first bracket, the protruding part and the first bracket jointly press the elastic member.

19. Smart glasses, comprising:
a rotating mechanism, wherein the rotating mechanism comprises:
a first bracket, provided with an accommodating space;
a second bracket;
an elastic member, disposed in the accommodating space; and
a sliding member, wherein one end of the sliding member is movably connected to the first bracket through the elastic member, another end of the sliding member is rotatably connected to the second bracket; when the second bracket rotates relative to the first bracket through the sliding member, the second bracket drives the sliding member to slide relative to the accommodating space to allow the elastic member to be elastically deformed; a protruding part is provided at one end of the sliding member, the protruding part abuts against one end of the elastic member, and the first bracket abuts against another end of the elastic member; when the second bracket rotates relative to the first bracket, the protruding part and the first bracket jointly press the elastic member; and
a processor, configured to process acquired data to enable the smart glasses to realize a preset function.

* * * * *